April 26, 1955 J. G. KENNARD 2,707,086
REMOTE CONTROL PRESSURE RELEASE DEVICE
Filed July 1, 1952 2 Sheets-Sheet 1
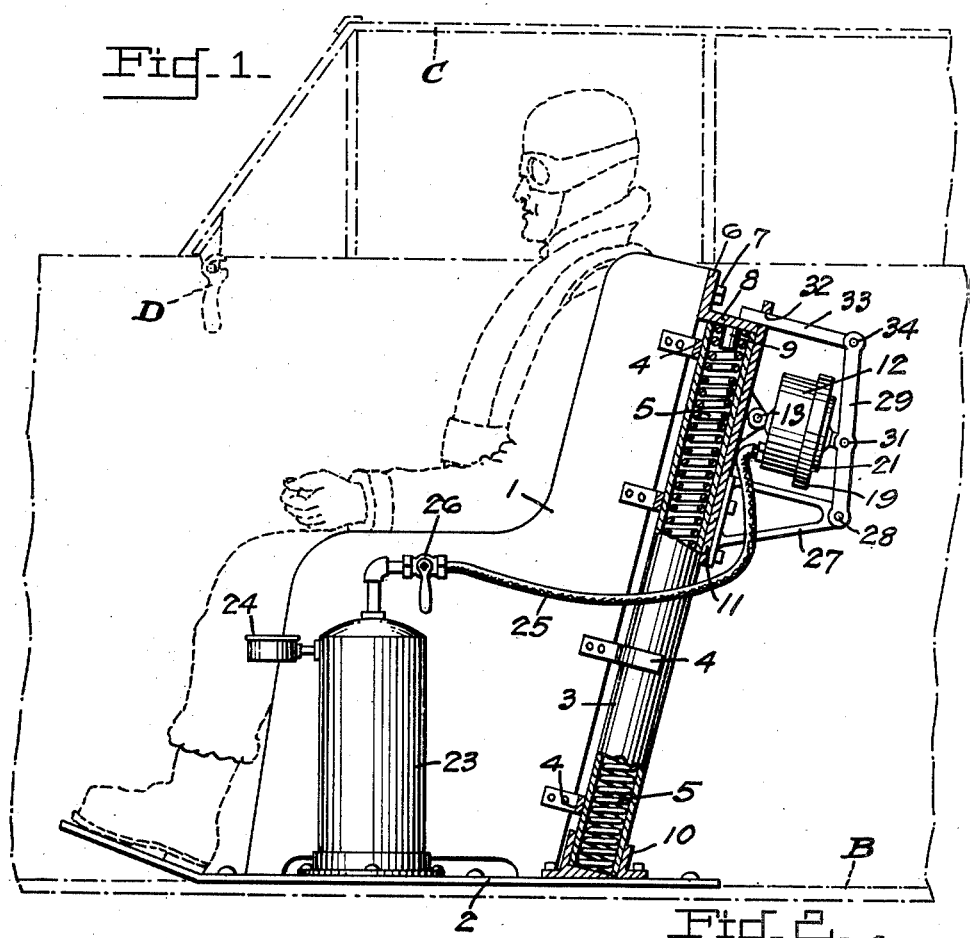
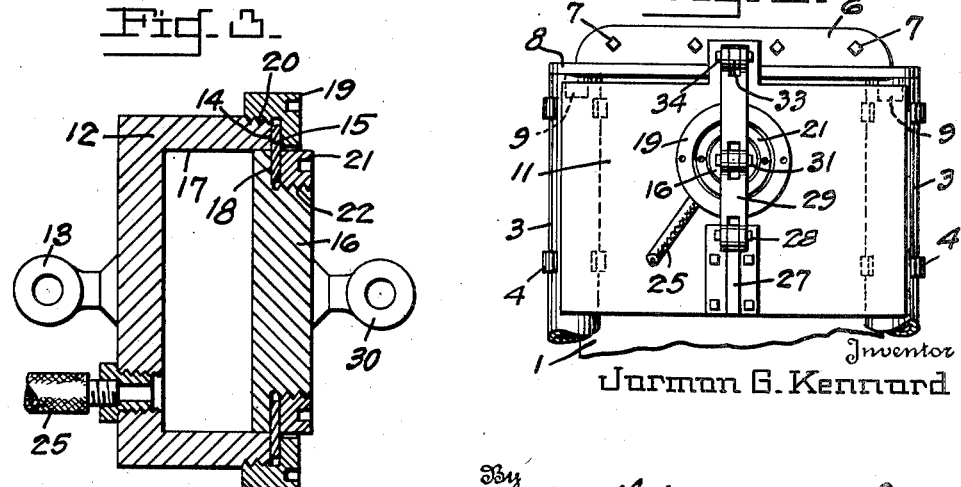
Inventor
Jarman G. Kennard

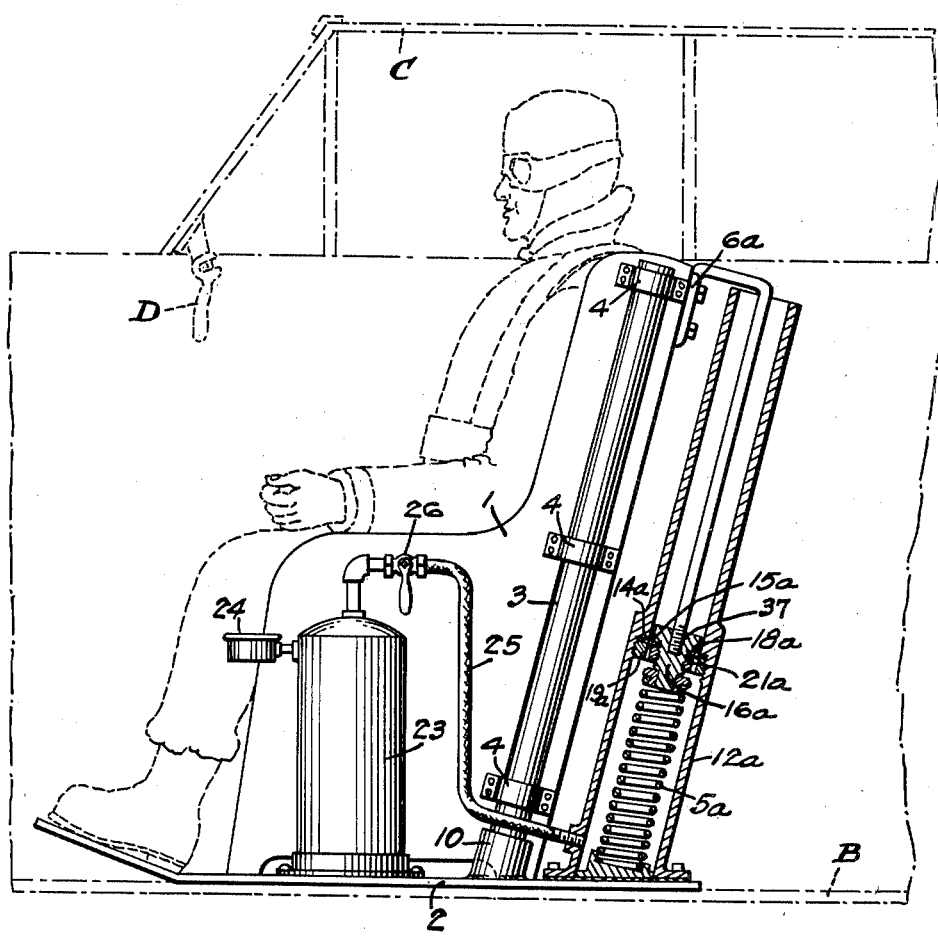

United States Patent Office

2,707,086
Patented Apr. 26, 1955

2,707,086

REMOTE CONTROL PRESSURE RELEASE DEVICE

Jarman G. Kennard, Schenectady, N. Y., assignor to the United States of America as represented by the Secretary of the Army Application July 1, 1952, Serial No. 296,701

14 Claims. (Cl. 244—122)

This invention relates to an escape device and more particularly to one which can be used to safely eject a chair and its occupant from an aircraft in flight.

An object of the invention is to provide a spring driven catapult in which a prestressed spring is positioned in a guide and held against release by a fracturable element.

Another object of the invention is to provide a hollow cylinder having a piston slidably fitted therein, and having registerable deformation in the cylinder and the piston for seating the fracturable element in airtight condition.

Another object of the invention is to provide a fluid pressure reservoir and means connected thereto and to the hollow cylinder whereby pressure may be directed to the interior of the hollow cylinder to break the fracturable element and release the catapult or other object to the action of the pressure fluid in the reservoir.

Another object of the invention is to position a fluid pressure control valve in a location convenient to the occupant of the catapult chair.

Other objects and advantages will be apparent from the following detailed description and the accompanying drawings, in which:

Figure 1 is a side elevation of the invention with parts broken away to show the ejecting spring;

Figure 2 is a rear elevation of the upper part of the chair back and the attached cylinder;

Figure 3 is a sectional view of the pressure chamber and frangible element taken substantially in the plane of Figure 1.

Figure 4 is a view similar to Figure 1 with parts broken away to show a modified arrangement of the fracturable element.

The present invention was devised to safely eject pilots or passengers from present high speed aircraft. It will be noted that supplies or munitions may also be ejected safely thereby.

In some devices of this type the propellant used is an explosive which produces an unpleasant jar when detonated close to the head of the occupant of the chair.

Another objection to the explosive type is the danger of fire if the aircraft is not being abandoned.

In the drawings, wherein for the purpose of illustration, is shown two forms of the invention, the reference character B indicates a portion of an aircraft cockpit. Overlying the cockpit and secured thereto in the usual manner is a canopy C having a hand release D for use by the occupant of the chair 1 just prior to departure from the aircraft, as will be clearly seen by reference to the drawings.

Figures 1, 2 and 3 illustrate one form of the invention.

Secured to the floor of the cockpit in any conventional manner is a baseplate 2 which supports the chair or support 1 and associated elements.

Two spaced tubular guides 3 are placed at the back of the chair, parallel thereto and to each other so as to receive the clips 4 which are fastened to the chair. A spring 5 is enclosed in each tubular guide 3 which guides serve the double purpose of guiding both the chair and confining and protecting the springs.

An L-shaped abutment 6 is secured to the chair back by any suitable fasteners 7 and has one flange 8 extended to cover the upper ends of both tubular guides 3. Cylindrical retainers 9 are secured to the flange 8 near its ends and fit inside the upper convolutions of the springs 5 as is obvious from inspection of Figure 1.

The tubular guides 3 are securely held to the baseplate 2 by an angular fitting 10.

At the upper portion of the tubular guides 3 and bridging them is a brace 11 in the form of a flat plate secured to the guides 3 by welding or other suitable means.

A hollow cylinder 12 is pivotally secured to the brace 11 by fitting 13 and has its open end shaped so as to form a seat 14 for a ring-shaped fracturable or frangible sealing member 15. A piston 16 fits the bore 17 of the cylinder 12 and is so shaped as to form a seat 18 registerable with the seat 14 on the cylinder 12 and receiving the inner peripheral portion of sealing member 15. A clamping ring 19 threadedly engages the cylinder 12 at 20 and a clamping ring 21 threadedly engages the piston 16 at 22, thus producing an airtight seal of the space within the cylinder.

A fluid pressure reservoir in the form of a tank 23 is secured to the baseplate 2 and has a pressure indicating gauge 24 conveniently located within the range of vision of the occupant of the chair 1.

Pressure is conducted from the reservoir 23 to the cylinder 12 by a hose 25 and a hand operated valve 26, also convenient to the occupant of the chair.

Secured to the brace 11 adjacent the cylinder 12 is a bracket 27, the outer end of which pivotally supports at 28, a lever 29 of the second order. A pierced lug 30 on the piston 16 is pivotally connected at 31 to the lever 29. The brace 11 has an opening 32 aligned with the top of flange 8 of the L-shaped abutment 6 and adapted to slidably receive a latch 33 which is pivoted to the lever 29 and 34.

Figure 4 illustrates a slightly modified form of the invention wherein the driving spring 5a is housed in a hollow cylinder 12a.

As shown in this figure a baseplate 2 is secured to the floor of the cockpit in any conventional manner and a tubular guide 3 is supported in a socket 10 secured to the baseplate 2.

Clips 4 are secured to a chair or support 1 and embrace the guides 3 to insure right line movement of the chair.

Behind the chair and centrally located thereto is a cylinder 12a secured to the base plate 2 and extending upwardly parallel to the tubular guides 3.

A fluid pressure tank 23 is secured to the baseplate 2 and has a pressure gauge 24 and an outlet valve 26 to supply fluid pressure to the hollow cylinder 12a as hereinbefore stated.

The hollow cylinder 12a is deformed at 14a to form a seat for the outer peripheral portion of a sealing ring 15. A piston 16a is deformed at 18a to form a seat registerable with the seat 14a to receive the inner periphery of the ring. Clamping rings 19a and 21a force the sealing member 15 against its seats to effect an airtight seal of the lower portion of cylinder 12a.

A bracket or abutment 6a has an extension which enters the hollow cylinder 12a and is secured to the piston 16a by a screw-threaded connection 37.

The operation of both forms of the device is similar. Pressure in the tank must be raised to a degree sufficient to break the sealing member when the pressure is admitted to the hollow cylinder. If it is desired to leave the aircraft a passenger has only to be strapped in the chair or support of the catapult, release the canopy latch D and turn the valve 26 to the open position. Pressure will then shear the ring 15 in the device as shown in Figures 1, 2 and 3 or the ring 15a in Figure 4.

When the springs 5 or 5a are released by fracture of the ring 15 or 15a,-after operation of the valve 26, fluid pressure is admitted to the cylinder 12 or 12a, at which time the latch 33 of Figure 1 or piston 16a of Figure 4, is released and pressure of spring 5 or 5a in Figure 1 or 4, respectively will drive the chair and its occupant upwardly and safely clear of the aircraft. It is to be noted that with this preferred form of the invention, the expansion of the pressure fluid within the cylinder effectively assists the spring in ejection of the chair after the ring has been sheared.

It is obvious that once the canopy latch is released the airstream will lift the canopy and permit egress of the chair and occupant.

It is to be understood that the form of the invention, herewith shown and described, is to be taken as a preferred example of the same, and that various changes in the shape, size and arrangement of parts may be resorted to, without departing from the spirit of the invention, or the scope of the subjoined claims.

For example, if desired, latch D may be connected for operation by pressure from tank 23 under control of valve 26. The valve, when moved to a first or initial position will then effect release of latch D while movement of the valve to a second or subsequent position will effect shearing of the ring 15 or 15a. Thereby the inadvertent shearing of the rings prior to release of the canopy is prevented.

Having now fully disclosed the invention, what I claim and desire to secure by Letters Patent is:

1. A catapult for airplanes comprising a support, a hollow cylinder with a fluid tight closure mounted therein, connecting means on said closure and said support for normally restraining said support, means for operatively connecting the cylinder with a source of pressurized fluid, an element normally connecting said fluid tight closure and said cylinder to restrain relative motion therebetween, said element being fracturable to release said fluid tight closure upon admission of pressurized fluid into the cylinder, and a compressed coil spring normally restrained by said closure and released to eject said support when said fluid tight closure is released.

2. A catapult as recited in claim 1, said fracturable element being a flat annulus, means clamping the outer periphery of said annulus to said cylinder, and means clamping the inner periphery of said annulus to said closure.

3. In an emergency ejection device for aircraft, a cylinder having a first coaxial circular shoulder, a piston in said cylinder having a second coaxial shoulder, a shear ring having its outer and inner peripheries overlapping said shoulders, respectively, means clamping the outer periphery of said ring to said first shoulder in pressure-tight relation therewith, means clamping the inner periphery of said ring to said second shoulder in pressure-tight relation therewith, whereby a pressure-tight chamber is provided within said cylinder, and means adapted to connect said cylinder to a source of pressure fluid.

4. The device recited in claim 3, and means connected with one only of said cylinder and piston to eject an article from the aircraft.

5. The device recited in claim 3, and a spring compressed within said cylinder urging said piston out of said cylinder.

6. In an emergency ejection device for aircraft, a cylinder having one end only closed and a first peripheral shoulder adjacent its other end, a piston fitting said cylinder and having a second peripheral shoulder confronting said first shoulder, a flat shear ring having its outer and inner peripheries overlapping said shoulders respectively, a first clamping ring threaded to said cylinder and clamping the outer periphery of said shear ring onto said first shoulder in pressure-tight relation therewith, a second clamping ring threaded to said piston and clamping the inner periphery of said shear ring onto said second shoulder in pressure-tight relation therewith, whereby a pressure-tight chamber is formed in said cylinder, and means adapted to connect said cylinder with a source of pressure fluid.

7. An emergency ejection device as in claim 6, an article to be ejected, means guiding said article in translation only in a fixed direction of ejection movement, the axis of said cylinder being parallel with said direction, and a driving connection between said article and said piston.

8. An emergency ejection device as in claim 7, and a spring within said cylinder under compression between the closed end thereof and said piston, to urge said piston out of said cylinder in article-ejection movement.

9. In a catapult for airplanes, a support, an abutment connected with said support, means mounting said support for guided translation in a path generally perpendicular to the flight direction of the airplane, from a first normal position within the airplane to a second position free of the airplane, a tube fixed to the airplane parallel with said path and adjacent said support, a coil spring within said tube and under compression between the lower end thereof and said abutment, and means for releasably securing said abutment with respect to said tube, said last-named means comprising a pressure-tight chamber having a frangible wall, a source of pressure fluid, and a conduit connecting said source and chamber, including a manually-operable valve whereby said abutment is released in response to introduction of pressure into said chamber and consequent breaking of said wall.

10. In a catapult for airplanes, a base, a seat, a tube fixed on said base generally perpendicular to the normal flight path of the airplane, means guiding said seat for translation only parallel with said tube, an abutment fixed to said seat, a spring under compression in said tube between the lower end thereof and said abutment, means releasably securing said abutment in position fixed with said tube, said means including a pressure-tight chamber having a frangible wall, a source of fluid under-pressure, a conduit connecting said source and chamber, and a manually controlled valve in said conduit, whereby said wall is broken to release said abutment in response to introduction of pressure fluid into said chamber.

11. An escape device for the safe ejection of an occupant from an aircraft comprising a baseplate secured to said aircraft, a chair having guide loops thereon said chair resting on said base plate, a cylindrical guide secured to said baseplate on each side of said chair and extending through said guide loops in the direction of ejection, a hollow cylinder secured to said baseplate and extending parallel to said cylindrical guides at a spaced distance and having a first coaxial circular shoulder, a piston in said hollow cylinder having a second coaxial shoulder, a shear ring having its outer and inner peripheries overlapping said shoulders, respectively, means engageable with the inner wall of said hollow cylinder for clamping the outer periphery of said ring to said first shoulder in pressure-tight relation therewith, means engageable with said piston for clamping the inner periphery of said ring to said second shoulder in pressure-tight relation therewith, whereby a pressure-tight chamber is provided within said cylinder, means adapted to connect said pressure tight chamber to a source of pressure fluid, means connecting said piston and said chair, and a prestressed spring within said chamber and bearing against said piston whereby the thrust of said spring is directed against said piston to eject said chair when said shear ring is broken.

12. In a catapult for aircraft, the combination of a hollow cylinder having an inner peripheral shoulder and a piston operatively mounted therein and having an outer peripheral shoulder adjacent the inner peripheral shoulder of said cylinder, a flat ring-shaped element, a pair of nuts screw threaded to said piston and to the interior of said cylinder, respectively, said nuts clamping said ring-shaped element to the respective shoulders of said cylinder and piston in fluid-tight relation therewith to restrain relative motion therebetween, conduit means to admit fluid under pressure into said cylinder to fracture said ring-shaped element and release said piston, and a spring-pressed unit operatively connected with said piston for release of the unit in response to fracture of said element.

13. A catapult as recited in claim 12, said spring-pressed unit including a spring normally under tension, a support mounted for guided ejection from an aircraft, and a connection between said spring and support for ejection of said support in response to fracture of said element.

14. In a catapult for airplanes, a base, a support on said base, a tube fixed on said base generally perpendicular to the normal flight path of the airplane and having one end only open, means guiding said support for translation parallel with said tube, an abutment fixed to said support and overlying the open end of said tube, a spring under compression in said tube between the closed end thereof and said abutment, means releasably securing said abutment in position fixed with said tube, said means including a bracket rigidly connected with said tube, a lever pivoted on said bracket, a latch connected with said lever remote from the pivot thereof and movable from a first position engaging and restraining said abutment, to a second position freeing said abutment for movement under urge of said spring, a pressure-tight chamber carried by said tube and having a frangible wall connected with said lever to move said latch to second position in response to fracture of said wall, a source of fluid under pressure, conduit means connecting said source and chamber, and a valve in said conduit means, said valve being manually operable to release pressure into said chamber and effect fracture of said wall.

References Cited in the file of this patent

UNITED STATES PATENTS

| | | |
|---|---|---|
| 2,459,948 | Lobelle | Jan. 25, 1949 |
| 2,516,902 | Musser | Aug. 1, 1950 |

FOREIGN PATENTS

| | | |
|---|---|---|
| 444,289 | France | Aug. 3, 1912 |
| 593,000 | Great Britain | Oct. 6, 1947 |
| 719,226 | France | Nov. 14, 1931 |